(12) United States Patent
Tanaka et al.

(10) Patent No.: US 6,235,186 B1
(45) Date of Patent: May 22, 2001

(54) APPARATUS FOR PRODUCING ELECTROLYTIC WATER

(75) Inventors: Masashi Tanaka; Yoshinori Nishiki; Naoya Hayamizu; Naoaki Sakurai, all of Kanagawa (JP)

(73) Assignee: Permelec Elctrode Ltd., Kanagawa (JP)

( * ) Notice: Subject to any disclaimer, the term of this patent is extended or adjusted under 35 U.S.C. 154(b) by 0 days.

(21) Appl. No.: 09/315,945

(22) Filed: May 21, 1999

(51) Int. Cl.[7] .................................................. C25B 1/46
(52) U.S. Cl. ......................... 205/521; 204/253; 204/282
(58) Field of Search .................................. 205/464, 758, 205/521; 204/253, 282, 630

(56) References Cited

U.S. PATENT DOCUMENTS 5,578,181 * 11/1996 Hirose et al. ........................ 204/523
5,965,009 * 10/1999 Shimamune et al. ................ 205/742

* cited by examiner

*Primary Examiner*—Kathryn Gorgos
*Assistant Examiner*—Thomas H Parsons
(74) *Attorney, Agent, or Firm*—Sughrue, Mion, Zinn, Macpeak & Seas, PLLC

(57) ABSTRACT

An apparatus for producing electrolytic water in which the yielded electrolytic water does not suffer quality deterioration caused by chemical species, e.g., hydrogen ions, moving to the counter-electrode chamber. A diaphragm 4 of a two-chamber type electrolytic cell comprises two or more ion-exchange membranes 3, and a noble-metal layer 2 or another layer may be formed in the diaphragm. Use of the ion-exchange membranes produces an enhanced physical screening effect, while formation of the noble-metal layer produces catalytic effect to decompose chemical species. Both the ion-exchange membranes and the anode-metal layer are effective in diminishing the movement of chemical species to the counter-electrode chamber.

23 Claims, 1 Drawing Sheet

APPARATUS FOR PRODUCING ELECTROLYTIC WATER

BACKGROUND OF THE INVENTION

1. Field of The Invention

The present invention relates to an apparatus for producing electrolytic water having an excellent cleaning effect, i.e., anode water (acidic water) and/or cathode water (alkaline water). More particularly, this invention relates to an apparatus for producing anode water and/or cathode water which both have an excellent cleaning effect and may be used for cleaning electronic devices, e.g., semiconductors and liquid crystals.

2. Description of the Related Art

In producing and cleaning highly integrated electronic parts, such as liquid crystals and semiconductor wafers, cleaning media specially prepared for these purposes have conventionally been used, such as, e.g., sulfuric acid, hydrofluoric acid, hydrogen peroxide, and hydrochloric acid. These cleaning media will continue to be suitably used for certain applications. However, since these cleaning media are obtained by specially purifying corresponding products produced through chemical processes, the purification operations are complicated because they involve removing metallic ingredients that have come into contact with the chemical products, for example, from the catalysts used for producing the products. As a result, the purified products are expensive. In addition, even if the purification operations are conducted carefully, the thus-purified products are not always sufficiently pure in view of the reduced amount of allowable impurities resulting from the progress of electronic devices. Now substitute techniques are hence desired.

One of these substitute techniques is to use ozonized water. In particular, highly ozonized water produced by electrolysis is known to be exceedingly effective, e.g., in cleaning electronic devices. However, since the use of ozonized water alone is insufficient in some cases, there is a growing desire for a treatment liquid that has one or more functions not possessed by ozonized water, e.g., an oxidizing function and a reducing function, and which contains no metallic ingredients.

One such treatment liquid is anode water or ultra-acidic water. Anode water generally has a pH of 2.7 or lower and an oxidation-reduction potential (ORP) of 1.1 V or higher and hence has an oxidizing ability. Consequently, anode water has the effect of, for example, decomposing organic substances or dissolving metallic deposits therein to remove these impurities, and is used for the cleaning of electronic devices, etc., although the amount used remains small.

Simultaneously with the production of the anode water in an electrolytic cell, cathode water having a pH of 10 or higher and an ORP of 0 V or lower is yielded as a by-product in the cathode chamber of the electrolytic cell. It has been reported that when electrolytic water having oxidizing properties or having reducing properties (the former being called acidic water or anode water and the latter being called cathode water or alkaline water) both produced through water electrolysis, which is a relatively simple operation, is used in place of a reagent such as a high-purity acid or alkali or hydrogen peroxide, then the water not only produces the same cleaning effect as the reagent but considerably reduces costs.

An ordinary electrolytic water, e.g., anode water, is easily obtained by conducting electrolysis while feeding dilute hydrochloric acid to an electrolytic cell as anolyte feed material. In the case of electrolysis, which generates ozone and other substances, water having a high ORP is obtained by merely feeding pure water to an electrolytic cell. It has also been reported that a target electrolytic water can be obtained at a lower cost by a technique in which chloride ions as a feed material are fed to a cathode chamber and are then sent to an anode chamber through a membrane.

The production efficiency of anode water and cathode water varies depending on the kind of feed water, the kind of electrode catalyst, and the operating conditions including current density. Effective anode water and cathode water preferably contain, in a high concentration, radicals that enhance the cleaning effect of the water.

In producing an electrolytic water to be used for semiconductor cleaning, it is necessary to minimize the inclusion of impurities generated in the electrolytic cell and the cell should not generate heavy-metal impurities attributable to an electrode. Among the preferred electrode catalysts capable of inhibiting the generation of such impurities is an iridium oxide catalyst. However, since this catalyst has an insufficient resistance to chlorine and ozone gases, which serve to stably generate radicals, the catalyst contributes little to an increase in cleaning effect. Although an electrolytic water having an excellent cleaning effect is obtained if radicals can be stably generated, the generation of radicals is influenced not only by the catalyst but by other electrolysis conditions such as the kind of feed water and current density.

In general water electrolysis, oxygen generates from the water on the anode side where the water is deprived of electrons (formula (1)). The addition of hydrochloric acid is intended to accelerate the generation of free chlorine and hypochlorous acid (formulae (2) and (3)). Ozone can generate depending on the catalyst selected (formula (4)).

$$2H_2O \rightarrow O_2 + 4H^+ + 4e \quad (1)$$

$$2Cl^- \rightarrow Cl_2 + 2e \quad (2)$$

$$Cl_2 + H_2O \rightarrow HClO + H^+ + Cl^- \quad (3)$$

$$3H_2O \rightarrow O_3^+ + 6H^+ + 6e \quad (4)$$

The hydrogen ions yielded by the anodic reaction shown by formula (1) are partly reduced to hydrogen on the cathode, and the other hydrogen ions remain in the anode to make the water acidic. A high ORP is derived from the ORP's of free chlorine and hypochlorous acid. Although the generation of oxygen proceeds in preference to chlorine generation from the standpoint of equilibrium, the latter reaction also proceeds on many electrodes. It is easy to conduct chlorine discharge in preference to oxygen discharge by suitably selecting a catalyst. The current efficiency in the oxidation reaction of chloride ions depends on concentration and pH.

Ozone is known to be generally unstable and react with water to yield active OH radicals and O radicals. It has however been reported that in pure water, ozone is fairly stable and has a half-life period as long as several hours. This indicates that radical generation by ozone decomposition requires a stimulus, such as a certain amount of impurities or ultraviolet exposure, and a catalyst. Consequently, an effective technique for generating radicals is to dissolve a slight amount of a catalyst or to fix, within a piping of the cell, a substance accelerating ozone decomposition so that this substance is in contact with an electrolytic water. However, these techniques are unnecessary where the ozone or active chlorine contained in the electrolytic water decomposes upon contact with fouling substances adhered to the parts being cleaned and thus OH and O radicals are generated.

In elementary processes of an electrode reaction, the adsorbed ions and water molecules generate an intermediate discharge species. Namely, chemical species corresponding to radicals are generated on the electrode surface. It may be thought that these chemical species react with solution molecules and thus generate radical species. Where chloride ions are present, the following reaction processes for radical generation are presumed. In the following formulae, each species included in parentheses denotes a chemical species present on the electrode surface, while each species marked with the symbol "●" denotes a radical.

$$Cl^- \rightarrow (Cl) + e \quad (5)$$

$$(Cl) + H_2O \rightarrow ClOH^- + H^+ \quad (6)$$

$$ClOH^- \rightarrow Cl^- + \bullet OH \quad (7)$$

Furthermore, the following reaction processes for radical generation are expected, which begin with water oxidation.

$$H_2O \rightarrow (OH) + H^+ + e \quad (8)$$

$$(OH) + Cl^- \rightarrow ClOH^- \quad (9)$$

$$ClOH^- \rightarrow Cl^- + \bullet OH \quad (7)$$

Cathode water, which has a reducing ability, is originally derived from hydrogen gas. In an electrolytic cell having a cation-exchange membrane, hydrogen is generated on the cathode from either hydrogen ions that have moved from the anode side or the catholyte water.

On the other hand, hydrogen peroxide, which can be electrolytically generated directly or indirectly from oxygen, serves as a radical-generating material and is effective in cleaning, like ozone.

The electrolytic water thus produced by electrolysis, particularly those for use in the cleaning of semiconductors and the like, preferably do not contain ions and the like resulting from the counter-electrode chamber during electrolysis, nor do they contain the impurities described above, and thereby the quality of the water is improved.

SUMMARY OF THE INVENTION

An object of the present invention is to provide an apparatus for electrolytic-water production, which is capable of stably and highly efficiently yielding a high-quality electrolytic water having an excellent cleaning effect, particularly anode water or cathode water effective in cleaning liquid crystals and semiconductors in the electronics industry.

The present invention provides an apparatus for producing electrolytic water comprising a two-chamber electrolytic cell having a gas- and liquid-permeable anode and a gas- and liquid-permeable cathode, wherein both the anode and the cathode are deposited in contact with a diaphragm, said diaphragm comprising at least two ion-exchange membranes in intimate contact with each other.

Figure 1:
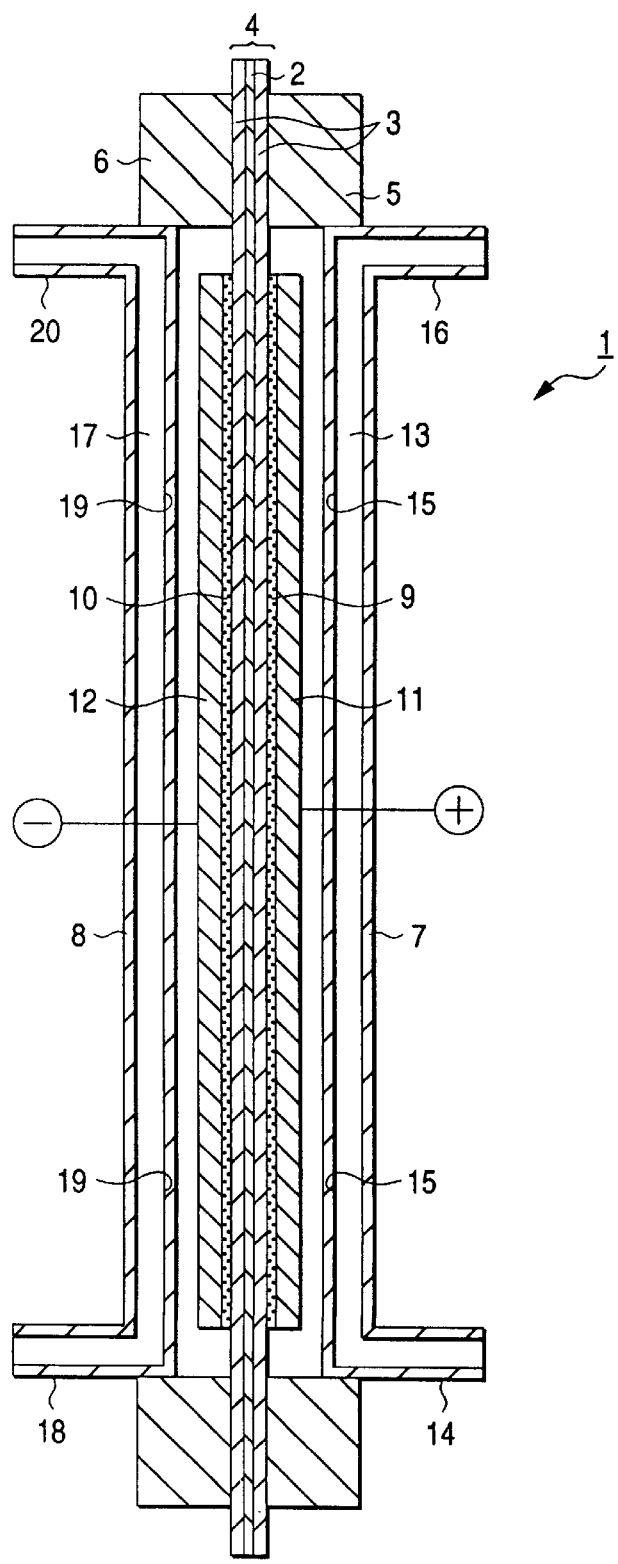
FIG. 1 is a diagrammatic vertical sectional view illustrating one embodiment of the apparatus for producing electrolytic water according to the present invention.

Description of Symbols—In FIG. 1, items 1 to 20 have the following meanings, as discussed further herein:

1 . . . electrolytic cell main body,
2 . . . noble-metal layer,
3 . . . cation-exchange membrane,
4 . . . diaphragm,
5 . . . anode chamber gasket,
6 . . . cathode chamber gasket,
7 . . . anode chamber wall plate,
8 . . . cathode chamber wall plate,
9 . . . anode,
10 . . . cathode,
11 . . . anode collector,
12 . . . cathode collector,
13 . . . anolyte passageway,
14 . . . anolyte inlet,
15 . . . anode chamber opening,
16 . . . anolyte outlet,
17 . . . catholyte passageway,
18 . . . catholyte inlet,
19 . . . cathode chamber opening,
20 . . . catholyte outlet.

DETAILED DESCRIPTION OF THE INVENTION

A feature of the present invention is that high-quality anode water or cathode water is obtained by preventing chemical species present in an electrolyte during two-chamber electrolytic reactions or chemical species that have been generated by electrolysis, from moving through the diaphragm into the counter-electrode chamber to impair the quality of the electrolyte present therein.

In the electrolysis reaction of water, oxygen and hydrogen are generated in the anode chamber and the cathode chamber, respectively. Prior to the generation of oxygen and hydrogen, hydroxyl ions and hydrogen ions are generated in the anode chamber and the cathode chamber, respectively. There are cases where these ions pass through the diaphragm and enter the respective counter-electrode chambers without being oxidized or reduced on the anode and the cathode, respectively. Such ion movement impairs the quality of the yielded anode water and cathode water. This quality deterioration most severally influences the ORP; it lowers the ORP of the anode water and elevates the ORP of the cathode water. However, this point has not previously received much attention, and an anode water of insufficient quality, e.g., having a poor cleaning ability, has been produced as a semiconductor-cleaning water.

The present invention eliminates the above problem and provides an apparatus for electrolytic-water production that is effective in inhibiting the movement of chemical species into the counter-electrode chamber to thereby improve the quality of the yielded electrolytic water.

In the present invention, either a diaphragm comprising two or more ion-exchange membranes in intimate contact with each other or a diaphragm comprising two or more ion-exchange membranes and at least one layer of, e.g., a metal foil intimately sandwiched between two of the ion-exchange membranes are used. Using two or more ion-exchange membranes is surprisingly more effective in inhibiting the movement of chemical species, e.g., ions, into the counter-electrode chamber as compared with using a single ion-exchange membrane.

A noble metal having a catalytic function, such as, e.g., platinum, palladium, ruthenium, or iridium, or a compound thereof may be deposited on any of the ion-exchange membranes. As a result, the chemical species passing through the membrane can be decomposed into harmless substances not influencing the quality of the electrolytic water. For example, hydrogen ions and oxygen ions are converted by the noble metal into water to thereby prevent these ions from deteriorating the quality of the electrolytic water. Furthermore, the noble-metal layer functions as a physical screening plate to prevent the electrolytes form mixing with each other. In this case, however, the noble metal deposited on an ion-exchange membrane should be insulated from each electrode. This is because if the noble metal is connected to the anode or cathode, it functions as an electrode to cause electrolytic reactions within the ion-exchange membrane.

In addition to noble metals, hydrogen occlusion metals (some of which, e.g., palladium, are noble metals) or alloys may be used. At least one foil of a hydrogen occlusion metal or alloy may be sandwiched between two of the ion-exchange membranes. Examples of the material of the foil include Pd, Pd—Au, Pd—Ag, and La—Ni. In this case, the foil functions as a bipolar electrode plate. Namely, the foil separates a proton passing therethrough into atomic hydrogen and an electron and leads them to the opposite side of the foil, where the atomic hydrogen recombines with the electron to form a proton again. Although a current flows as a result thereof, the foil produces an excellent screening effect on substances other than protons.

Other possible diaphragm constitutions include: one in which at least one of the ion-exchange membranes partly or wholly comprises a fibrous resin support; and one in which at least one fibrous resin support is sandwiched between two of the ion-exchange membranes. In these cases, the ion-exchange membranes and the electrodes have an uneven current distribution to produce an effect that radicals are stably generated in a larger amount even at a low current density. The thickness of the fibrous resin support is preferably from 0.01 to 5 mm, and the thickness of each fiber is preferably from 0.001 to 1 mm. The porosity of the support is preferably from 20 to 95%. The support is preferably made of a chemically stable insulating material. Examples thereof include hydrocarbon resins such as polypropylene and polyethylene, fluororesins such as polyvinylidene fluoride (PVDF), polytetrafluoroethylene (PTFE), and fluorinated ethylene propylene (FEP), and sintered ceramic fibrous structures.

The ion-exchange membranes are preferably perfluorocarbon type ion-exchange membranes having a satisfactory corrosion resistance (e.g., NAFION manufactured by E.I. du Pont de Nemours & Co., FLEMION manufactured by Asahi Glass Co., Ltd., and ACIPLEX manufactured by Asahi Chemical Industry Co., Ltd.). Unlike conventional neutral diaphragms, the ion-exchange membranes are almost completely liquid-impermeable even when used alone, and hence hardly permit the anolyte to mix with the catholyte. When a combination of two or more such ion-exchange membranes is used according to the present invention, optionally together with a noble metal deposited thereon or with a foil of a hydrogen occlusion metal or alloy, then ions and the like are more satisfactorily prevented from moving to the counter-electrode chamber. As a result, the decrease in efficiency caused by a partial mixing of the yielded anolyte (anode water) with the yielded catholyte (cathode water) and by the inclusion of chemical species present in either of the electrolytes into the other can be minimized, and also operation at a high current density is possible. Therefore, a desired amount of cleaning water can be obtained in a short period of time.

The anode preferably comprises a base made of a material sufficiently stable to oxidation so as to maintain the purity of the yielded anode water and a catalyst deposited on the surface of the base. Examples of the base material include metals such as noble metals, titanium, and tantalum, carbon, and conductive ceramics such as silicon carbide. Examples of the catalyst include noble metals such as platinum, ruthenium, and iridium, conductive ceramics, and diamond. The catalyst is preferably deposited in such an amount that a catalyst layer having a thickness of from 1 to 50 $\mu$m is formed on the base surface. The catalyst preferably is a conductive diamond because it exhibits low activity in the electrolysis reaction of water, has a high overvoltage, and hence contributes to radical generation.

The cathode preferably comprises a base made of a material sufficiently stable to reduction so as to maintain the purity of the yielded cathode water and a catalyst deposited on the surface of the base. Examples of the base material include metals such as noble metals, titanium, zirconium, and tantalum, carbon, and conductive ceramics such as silicon carbide. Examples of the catalyst include noble metals such as platinum, ruthenium, and iridium, conductive ceramics, and diamond. The catalyst is preferably deposited in such an amount that a catalyst layer having a thickness of from 1 to 50 $\mu$m is formed on the base surface. The catalyst preferably is a conductive diamond because it exhibits low activity in the electrolysis reaction of water, has a high overvoltage, and hence contributes to radical generation.

The anode and cathode are not particularly limited in shape. It is however preferred to use a plate-like member having a percentage of openings of from 40 to 80% in order to allow reactions to proceed smoothly. The surface of each member of the electrolytic cell may be coated with a stable film made of quartz or a PTFE resin.

For the purpose of producing anode water, preferably pure water and/or hydrochloric acid are fed to the anode chamber of the above-described electrolytic cell and a voltage is applied to the anode and the cathode. When pure water alone is fed, the cation-exchange membranes function as an electrolyte to generate oxygen (which may contain ozone) through water electrolysis. This oxygen dissolves in the anolyte to yield anode water.

When hydrochloric acid is fed to the anode chamber, chlorine ions are electrolytically oxidized to chlorine gas and then to hypochlorite ions to yield anode water having a low pH and a high oxidizing ability.

On the other hand, for the purpose of producing cathode water, preferably pure water and/or ammonium hydroxide are fed to the cathode chamber of the above-described electrolytic cell and a voltage is applied to the anode and the cathode. When pure water alone is fed, the cation-exchange membranes function as an electrolyte to generate hydroxyl ions through water electrolysis to yield cathode water.

When ammonium hydroxide is fed to the cathode chamber, the concentration of hydroxyl ions increases to yield a more powerful cathode water.

There are cases where the produced anode water or cathode water contains a minute amount of cations or anions. According to the present invention, a method may be used in which the obtained anode water or cathode water is passed through a column packed with a cationic or anionic resin installed outside the electrolytic cell to remove cationic or anionic impurities. Thus, anode water or cathode water having an even higher purity can be obtained.

The present invention is applicable also to electrolysis, in which anode water is produced in the anode chamber while feeding oxygen to the cathode chamber to synthesize hydrogen peroxide therein.

FIG. 1 is a diagrammatic vertical sectional view illustrating one embodiment of the apparatus for producing electrolytic water according to the preset invention.

The electrolytic cell main body 1 comprises: a diaphragm 4 composed of two perfluorocarbon type cation-exchange membranes 3 either of which has a noble-metal layer 2 deposited thereon (the drawing shows layer 2 between the membranes 3); an architrave-like anode chamber gasket 5 and an architrave-like cathode chamber gasket 6 between which peripheral parts of the diaphragm are sandwiched; and an anode chamber wall plate 7 and a cathode chamber wall plate 8 which are disposed respectively on the gaskets 5 and 6 on the sides opposite to the diaphragm 4 and which each functions to pass an electrolyte therethrough. At least other inner part of each of the wall plates 7 and 8 which comes into contact with an electrolyte is made of a fluororesin.

The cation-exchange membranes 3 have, on the anode side, a porous anode 9 which comprises particles of either a platinum group metal or an oxide thereof and is in intimate contact with the anode-side membrane 3. The cation-exchange membranes 3 further have, on the cathode side, a porous sheet-form cathode 10 which comprises platinum or carbon and is in intimate contact with the cathode-side membrane 3. To the anode 9 and the cathode 10 are respectively connected an anode collector 11 and a cathode collector 12. A voltage is applied through these collectors.

An anolyte passageway 13 has been formed within the anode chamber wall plate 7 so that an anolyte containing hydrochloric acid or the like dissolved therein fed through an anolyte inlet 14 enters the anode chamber through anode chamber openings 15 and comes into contact with the anode 9. As a result, the solute is oxidized into a compound having a high oxidizing ability and a high oxidation-reduction potential, e.g., hypochlorous acid. The resultant anolyte is taken out of the anolyte passageway as anode water through an anolyte outlet 16.

On the other hand, a catholyte passageway 17 has been formed within the cathode chamber wall plate 8 so that ultrapure water fed according to need through a catholyte inlet 18 enters the cathode chamber through cathode chamber openings 19 and comes into contact with the cathode 8. As a result, the pure water is reduced and taken out of the catholyte passageway as cathode water through a catholyte outlet 20.

In producing cleaning water using the electrolytic cell shown in the figure, the oxygen ions and hydrogen ions respectively contained in the anode water and cathode water, which are being produced at the anode 9 and cathode 10, are inhibited from moving to the respective counter-electrode chambers due to the physical screening effect of the two ion-exchange membranes 3 and the noble-metal layer 2. Furthermore, due to the catalytic effect of the noble-metal layer 2, the hydrogen ions and oxygen ions which are moving to the respective counter-electrode chambers are converted to water, whereby the yielded electrolytic waters are prevented from having impaired quality.

A foil of a hydrogen occlusion alloy or a fibrous resin support may be used in place of the noble-metal layer employed above. Use of such a foil or a fibrous resin support brings about an excellent screening effect attributable to proton separation or results in enhanced radical generation attributable to the resultant uneven current distribution. In either case, the substitute for the noble-metal layer contributes to an improvement in the quality of electrolytic water and to an improvement in electrolysis conditions.

Examples of the production of electrolytic water using an apparatus for electrolytic-water production according to the present invention are given below. However, these Examples should not be construed as limiting the scope of the invention thereto.

EXAMPLE 1

Three sheets of NAFION 117 (manufactured by E.I. du Pont de Nemours & Co.) superposed on each other were used as cation-exchange membranes, in which the central membrane had a platinum coating formed by electroless plating. An anode comprising a titanium mesh having an electrode area of 10 cm$^2$, which had been coated with an iridium oxide catalyst deposited thereon by pyrolysis, was intimately attached to the anode chamber side of the cation-exchange membranes. A cathode comprising a carbon sheet coated with a platinum catalyst was intimately attached to the cathode chamber side of the cation-exchange membranes. A cathode collector comprising a sintered plate (thickness, 2 mm) made of silver fibers was connected to the cathode. These members were united with each other by means of bolts and nuts to fabricate a two-chamber type electrolytic cell.

A current of 1 A was caused to flow through the electrodes while feeding ultrapure water (18 MΩ·cm) regulated so as to have a pH of 2.5 with hydrochloric acid to the anode chamber of the electrolytic cell at a rate of 10 cc/min. During this operation, the feed water tank, cell, and piping were cooled so as to result in a cell temperature of 20° C. or lower. DMPO (radical stabilizer) was added in an amount of 10 mM to the yielded outlet anode water, and this water was analyzed with an ESR apparatus to conduct radical detection. As a result, a peak assignable to OH radicals was observed. The presence of 500 ppm ozone in the anode gas and 100 ppm chlorine dissolved in the anolyte were ascertained. However, no hydrogen gas was detected. The outlet anode water had an ORP of 1,100 mV and a total heavy-metal concentration of 50 ppt.

EXAMPLE 2

Electrolysis was conducted under the same conditions as in Example 1, except that platinum was not deposited on the central NAFION 117 sheet. As a result, the yielded anode water gave a peak assignable to OH radicals. The presence of 800 ppm ozone in the anode gas was ascertained. The outlet anode water had an ORP of 600 mV. The anode gas contained 10 ppm hydrogen. The total concentration of heavy metals in the outlet anode water was 20 ppt.

EXAMPLE 3

Electrolysis was conducted under the same conditions as in Example 1, except that ultrapure water (18 MΩ·cm) from which oxygen had been removed to adjust the pH thereof to 7.0 was fed to the anode chamber at a rate of 10 cc/min. Thereafter, hydrochloric acid was added to the yielded outlet water to obtain anode water. DMPO was added in an amount of 10 mM to the anode water, and the resultant solution was analyzed. As a result, a peak assignable to OH radicals was observed. The presence of 800 ppm ozone in the anode gas was ascertained. The outlet anode water had an ORP of 1,000 mV and a total heavy-metal concentration of 20 ppt.

EXAMPLE 4

Electrolysis was conducted in the same manner as in Example 1, except that the cathode collector comprised a 2 mm-thick sintered plate made of carbon fibers, that ultrapure water regulated so as to have a pH of 7 was fed to the anode chamber at a rate of 10 cc/min, and that the cathode chamber was filled with 1 M hydrochloric acid. The resultant anode water was subjected to radical detection. As a result, a peak assignable to OH radicals was observed. The presence of 200 ppm ozone in the anode gas and that of 500 ppm chlorine gas dissolved in the anolyte were ascertained. The outlet anode water had an ORP of 1,000 mV and a total heavy-metal concentration of 20 ppt. The cell voltage was 4.5 V.

EXAMPLE 5

Electrolysis was conducted under the same conditions as in Example 4, except that two sheets of NAFION 117 and a sintered plate (thickness, 1 mm) made of PVDF fibers were used so as to sandwich the sintered plate between the NAFION 117 sheets, and that the feed water tank, electrolytic cell, and piping were cooled so as to result in a cell temperature of 20° C. or lower. As a result, the yielded anode water gave a peak assignable to OH radicals. The presence of 400 ppm ozone in the anode gas and 500 ppm chlorine gas dissolved in the anolyte were ascertained. The outlet anode water had an ORP of 1,100 mV and a total heavy-metal concentration of 20 ppt. The cell voltage was 6.0 V.

EXAMPLE 6

The anode and cathode used in Example 1 were used. Two sheets of NAFION 117 and a foil of Pd—Ag (thickness, 50 μm) were used so as to sandwich the foil between the NAFION 117 sheets. These members were united with each other by means of bolts and nuts to fabricate a two-chamber type electrolytic cell. A current of 1 A was caused to flow through the electrodes to conduct electrolysis while feeding ultrapure water (18 MΩ·cm) regulated so as to have a pH of 2.5 with hydrochloric acid to the anode chamber at a rate of 10 cc/min and further feeding ultrapure water regulated so as to have a pH of 10 with ammonia water to the cathode chamber at a rate of 10 cc/min. During this operation, the feed water tank, electrolytic cell, and piping were cooled so as to result in a cell temperature of 20° C. or lower. As a result, the outlet cathode water had an ORP of −900 mV and a total heavy-metal concentration of 10 ppt.

EXAMPLE 7

Electrolysis was conducted under the same conditions as in Example 1, except that a 2 mm-thick porous SiC plate having a diamond deposit doped with 5,000 ppm boron was used as an anode. As a result, the yielded anode water gave a peak assignable to OH radicals. The presence of 400 ppm ozone in the anode gas and that of 500 ppm chlorine gas dissolved in the anolyte were ascertained. The outlet anode water had an ORP of 1,100 mV and a total heavy-metal concentration of 1 ppt or lower. The cell voltage was 10 V.

The apparatus for electrolytic-water production of the present invention, which is a two-chamber type electrolytic cell having a gas- and liquid-permeable anode and a gas- and liquid-permeable cathode both deposited in contact with a diaphragm, is characterized in that the diaphragm comprises two or more ion-exchange membranes in intimate contact with each other.

Since the diaphragm employed in the apparatus of the present invention comprises two or more ion-exchange membranes, it produces a higher physical screening effect as compared with an apparatus in which a single ion-exchange membrane is used. As a result, the movement of chemical species to a counter-electrode chamber can be inhibited, which movement leads to quality deterioration of the yielded anode water or cathode water.

Furthermore, when at least one of the ion-exchange membranes has a noble-metal layer formed thereon so as to be connected to neither electrode, the noble-metal layer not only has a physical screening effect but also converts the chemical species into harmless substances due to the catalytic effect of the metal. Thus, the noble-metal layer contributes to a quality improvement.

In place of the noble-metal layer, at least one foil of a hydrogen occlusion metal or alloy may be sandwiched between two of the ion-exchange membranes to constitute an electrolytic cell. This foil separates a proton passing therethrough into atomic hydrogen and an electron and leads them to the opposite side of the foil, where the atomic hydrogen recombines with the electron to form a proton again. The foil thus produces an excellent screening effect.

A fibrous resin support may be used together with the ion-exchange membranes. The fibrous resin support causes the ion-exchange membranes and the electrodes to have an uneven current distribution and thereby results in radicals that are stably generated in a larger amount even at a low current density. The fibrous resin support hence contributes to an improvement in electrolysis efficiency and an improvement in the cleaning ability of the yielded electrolytic water.

While the invention has been described in detail and with reference to specific embodiments thereof, it will be apparent to one skilled in the art that various changes and modifications can be made therein without departing from the spirit and scope thereof.

What is claimed is:

1. An apparatus for producing electrolytic water comprising a two-chamber electrolytic cell partitioned by a diaphragm into an anode chamber having a gas- and liquid-permeable anode and a cathode chamber having a gas- and liquid-permeable cathode, said diaphragm comprising at least two ion-exchange membranes in intimate contact with each other or comprising at least two ion-exchange membranes and a metal foil intimately sandwiched between two of the ion-exchange membranes, and wherein the anode and the cathode are disposed on opposing sides of said diaphragm.

2. The apparatus for producing electrolytic water of claim 1, wherein at least one of the ion-exchange membranes has a noble-metal layer, which noble-metal layer is disposed so as to be in contact with neither the anode nor the cathode.

3. The apparatus for producing electrolytic water of claim 1, wherein the diaphragm comprises at least one foil of a hydrogen occlusion metal or alloy interposed between two of the ion-exchange membranes.

4. The apparatus for producing electrolytic water of claim 3, wherein the hydrogen occlusion metal or alloy is selected from the group consisting of Pd, Pd—Au, Pd—Ag and La—Ni.

5. The apparatus for producing electrolytic water of claim 1, wherein at least one of the ion-exchange membranes comprises a fibrous resin support or the diaphragm has at least one fibrous resin support interposed between two of the ion-exchange membranes.

6. The apparatus for producing electrolytic water of claim 5, wherein the fibrous resin support has a thickness of 0.01 to 5 mm.

7. The apparatus for producing electrolytic water of claim 5, wherein the fibrous resin support comprises fibers and each fiber has a thickness of 0.001 to 1 mm.

8. The apparatus for producing electrolytic water of claim 5, wherein the fibrous resin support has a porosity of 20 to 95%.

9. The apparatus for producing electrolytic water of claim 5, wherein the fibrous resin support comprises a material selected from the group consisting of hydrocarbon resins.

10. The apparatus for producing electrolytic water of claim 9, wherein the fibrous resin support is selected from the group consisting of polypropylene, polyethylene, polyvinylidene fluoride, polytetrafluoroethylene and fluorinated ethylene propylene.

11. The apparatus for producing electrolytic water of claim 1, wherein the ion-exchange membranes are perfluorocarbon ion-exchange membranes.

12. The apparatus for producing electrolytic water of claim 1, wherein the anode comprises a base and a catalyst deposited on the surface of the base.

13. The apparatus for producing electrolytic water of claim 12, wherein the base comprises noble metals, titanium, tantalum, carbon or conductive ceramics.

14. The apparatus for producing electrolytic water of claim 12, wherein the catalyst is selected from the group consisting of platinum, ruthenium, iridium, conductive ceramics and diamond.

15. The apparatus for producing electrolytic water of claim 12, wherein the catalyst is a conductive diamond.

16. The apparatus for producing electrolytic water of claim 1, wherein the cathode comprises a base and a catalyst deposited on the surface of the base.

17. The apparatus for producing electrolytic water of claim 16, wherein the base comprises noble metals, titanium, zirconium, tantalum, carbon or conductive ceramics.

18. The apparatus for producing electrolytic water of claim 16, wherein the catalyst is selected from the group consisting of platinum, ruthenium, iridium, conductive ceramics and diamond.

19. The apparatus for producing electrolytic water of claim 16, wherein the catalyst is a conductive diamond.

20. The apparatus for producing electrolytic water of claim 1, wherein said diaphragm comprises at least two ion-exchange membranes in intimate contact with each other.

21. A method for producing electrolytic water which comprises:

providing a two-chamber electrolytic cell partitioned by a diaphragm into an anode chamber having a gas- and liquid-permeable anode and a cathode chamber having a gas- and liquid-permeable cathode, said diaphragm comprising at least two ion-exchange membranes in intimate contact with each other or comprising at least two ion-exchange membranes and a metal foil intimately sandwiched between two of the ion-exchange membranes, and wherein the anode and the cathode are disposed on opposing sides of said diaphragm, supplying pure water to the anode and cathode chambers, passing an electric current through the electrolytic cell to produce by electrolysis anode water in the anode chamber and cathode water in the cathode chamber, said electrolysis generating hydrogen ion in the cathode chamber and hydroxyl ion in the anode chamber, and said diaphragm preventing hydroxyl ion generated in the anode chamber from entering the cathode chamber and preventing hydrogen ion generated in the cathode chamber from entering the anode chamber, and recovering anode water and cathode water from the electrolytic cell.

22. The method for producing electrolytic water of claim 21, which comprises supplying hydrochloric acid and pure water to the anode chamber.

23. The method for producing electrolytic water of claim 21, which comprises supplying ammonium hydroxide and pure water to the cathode chamber of the electrolytic cell.

* * * * *

UNITED STATES PATENT AND TRADEMARK OFFICE
CERTIFICATE OF CORRECTION

| | |
|---|---|
| PATENT NO. | : 6,235,186 B1 |
| DATED | : May 22, 2001 |
| INVENTOR(S) | : Tanaka, Masashi, Nishiki, Yoshinori, Hayamizu, Naoya, Sakurai, Naoaki |

It is certified that error appears in the above-identified patent and that said Letters Patent is hereby corrected as shown below:

Title page,
Below item [22], insert -- Item [30], Foreign Application Priority Data
                May 26, 1998   [JP]    Japan ..................... 10-162939 --

Signed and Sealed this

First Day of January, 2002

*Attest:*

*Attesting Officer*

JAMES E. ROGAN
*Director of the United States Patent and Trademark Office*